United States Patent Office 3,378,518
Patented Apr. 16, 1968

3,378,518
POLYPROPYLENE STABILIZER WITH
DURYLENE BIS-PHENOLS
Marshall E. Doyle, Alameda, Calif., assignor to Shell Oil
Company, a corporation of Delaware
No Drawing. Filed Sept. 28, 1959, Ser. No. 842,579
2 Claims. (Cl. 260—45.95)

This invention relates to novel compositions of olefin polymers. More particularly it relates to novel compositions of olefin polymers which have improved stability to all forms of degradation.

It is known that alpha-olefins as ethylene, propylene and higher homologs may be polymerized to produce useful polymers which may be molded, formed into fibers, sheets or tubes. The processes whereby these olefins are polymerized to produce the useful polymers are termed "low pressure" polymerizations and are exemplified by the teachings of Belgian Patent 533,362 and U.S. Patents 2,832,759 and 2,827,447; the catalysts are often referred to as "low pressure" or "Ziegler" catalysts. One of the disadvantages of the polymers produced by the low-pressure processes is that they are particularly susceptible to degradation. The reasons why the low-pressure polymers are particularly susceptible to degradation have not been established for certain but it has been proposed that one of the reasons is that they contain residues of the low-pressure catalysts and these residues may induce embrittlement. To combat the above-mentioned embrittlement it has been proposed to add to the polymers any of a number of stabilizers which would increase the period of time before harmful embrittlement takes place. While some success has been reported, the techniques for stabilization leave much to be desired because the low-pressure polymers are subject to attack from three major causes of embrittlement. These causes are the degradation caused by ultraviolet light, normal oxidation on exposure to the atmosphere, and degradation by heat. These three sources of degradation come into play only after the final polymer has been molded or shaped and do not include the harm caused by high temperatures encountered during processing, namely, a reduction in the molecular weight, or intrinsic viscosity, of the polymer.

Because of the several sources of embrittlement and degradation it has been believed that, in order to produce low-pressure polymer that is sufficiently stable to all sources of embrittlement, it is necessary and desirable to prepare polymer compositions which contain at least one stabilizer for each of the sources of embrittlement. Further, it is generally desirable to add a separate stabilizer that will reduce the damage during high-temperature processing. The result is that polymers prepared by the low-pressure methods are formulated and marketed with as many as three, four or even five different stabilizers which are intended to function against the various forms or causes of degradation. Such techniques are far from satisfactory and, in the last analysis, have been found not to produce a very high degree of stability even after all this effort has been expended in an attempt to produce stable polymer.

It is an object of this invention to provide compositions of polymers of alpha-olefins which have improved stability against embrittlement and degradation. More particularly it is an object of this invention to provide stable polymers of alpha-monoolefins which polymers contain metallic residues of low-pressure catalysts. More specifically, it is an object of this invention to provide compositions of polyolefins which are stabilized with a single compound that effectively retards embrittlement from all causes and aids in maintaining the molecular weight during high-temperature processing. Other objects will become apparent as the description of this invention proceeds.

These and other objects are accomplished by compositions comprising polymer of alpha-monoolefins and from 0.01 to 5% by weight, of the polymer, of a polynuclear polyhydric phenol of the formula

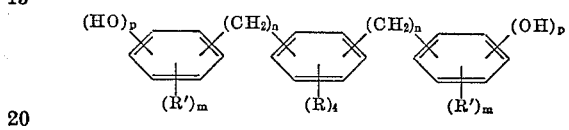

wherein the R's are alkyl radicals of 1 to 4 carbon atoms, the R's are aliphatic radicals of 1 to 8 carbon atoms, $n$ is an integer selected from 0 to 1, $m$ is an integer selected from 1, 2 and 3 and $p$ is an integer selected from 1, 2 and 3, the sum of $m+p$ ranging from 2 to 5. This class of compounds will be found to impart unexpected protection against all forms of embrittlement, and even against molecular weight degradation and these will be described more fully hereinafter.

The polymers of alpha-monoolefins stabilized by the present invention are represented by polymers of ethylene, propylene, butene-1, pentene-1, 3-methylbutene-1, hexene-1, 4-methylpentene-1, 4-methylhexene-1, 4,4-dimethylpentene-1, their copolymers, and the like. The polymers preferably are prepared by the low-pressure methods and accordingly they will normally contain small amounts of metallic catalyst residues, particularly transition metals of Groups IV–VI of the Mendeléeff Periodic Table and metal residues of a Group I–III metal. In the usual situation the metal residues will comprise titanium and aluminum, although vanadium and zirconium may often be present, depending on the particular low-pressure catalyst employed in the preparation of the polymer. Additionally the polymers often may contain small amounts of free iron, which is an impurity which comes into the polymer from the apparatus used to carry out the polymerization. The polymer of the alpha-olefin may be in the form of sheets, tubes, fibers, filaments, solid moldings, or the like, but irrespective of the form of the polymerized alpha-olefin the stabilizers employed in the course of the present invention will be found to impart improved resistance from all causes of embrittlement and degradation.

The polymers of the alpha-monoolefins are well-known to persons skilled in the art and their methods for preparation need not be described in great detail here.

The stabilizers employed in the present invention may be prepared by reacting, at elevated temperatures, about two moles of a phenol with one of the following:

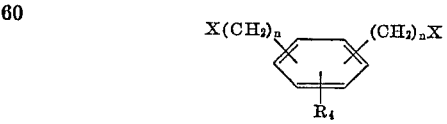

Bis(halomethyl)tetraalkylbenzene or bis(halo)tetraalkylbenzene, i,e., $n=0$ or 1

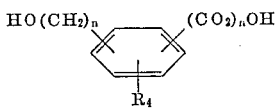

Bis(hydroxymethyl)tetraalkylbenzene or bis(hydroxy)tetraalkylbenzene, i.e., $n=0$ or 1

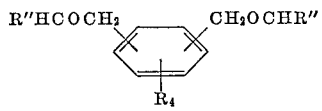

Bis(acyloxyalkyl)tetraalkylbenzene

A few representative reactions, without regard for the stoichiometry for the present, are illustrated as follows:

Bis(chloromethyl)durene+2,6-di-tert-butylphenol→1,4-bis[(4-hydroxy-2,6-di-tert-butylphenyl)methyl]durene 1,3(chloro)isodurene+2,4-xylenol→1,3-bis(2-hydroxy-3,5-dimethylphenyl)isodurene Preferred bis(halomethyl)tetraalkylbenzenes to be employed in the process include those compounds having a benzene ring substituted with two chloro-substituted aliphatic hydrocarbon radicals which have the chlorine atom on the alpha carbon atom, and the remaining ring carbon atoms substituted with four separate alkyl radicals containing no more than 10 carbon atoms. Particularly preferred are the bis(chloromethyl)tetraalkylbenzenes. The preferred bis(halo)tetraalkylbenzenes correspond to the halomethyl derivatives described above.

The bis(acyloxyalkyl)polyhydrocarbylbenzenes that may be used in the preparation of stabilizers of the invention may be exemplified by the following: 1,4-bis(acyloxymethyl)tetramethylbenzene, 1,3-bis(acetoxymethyl)tetrabutylbenzene, 1,2-bis(alpha-acetoxyethyl)tetraoctylbenzene, 1,4-bis(acyloxymethyl)tetraethylbenzene, 1,3-bis-(acetoxymethyl)tetrahexylbenzene and 1,3-bis(acyloxymethyl)tetraisopropylbenzene. Preferred bis(acyloxyalkyl)tetraalkylbenzenes that may be used in the preparation include those compounds having a benzene ring substituted with two alkanoyloxy-substituted aliphatic hydrocarbon radicals which have the acyloxy group substituted on the alpha-carbon atom and preferably contain no more than 6 carbon atoms, and the remaining ring carbon atoms substituted with four separate alkyl radicals preferably containing no more than 10 carbon atoms. Particularly preferred are the bis(acetoxymethyl)tetraalkylbenzenes. The bis(acyloxyalkyl)tetraalkylbenzenes may be obtained by reacting one of the above-described bis(haloalkyl)-substituted benzenes with a salt of the appropriate acid. Bis-(acetoxymethyl)benzene, for example, is obtained by reacting bis(chloromethyl)benzene with silver acetate or sodium acetate.

The bis(hydroxymethyl)tetraalkylbenzenes that may be used in the process of the invention may be exemplified by the following: 1,4-bis(hydroxymethyl)tetramethylbenzene, 1,3-bis(hydroxymethyl)tetraoctylbenzene, 1,2-bis(hydroxymethyl)tetrahexylbenzene, 1,4-bis(hydroxymethyl)tetrapropylbenzene, 1,3-bis(hydroxymethyl)tetradecylbenzene, 1,4-bis(hydroxymethyl(tetraisobutylbenzene, 1,4-bis(hydroxymethyl)tetraethylbenzene and the like. Similarly, the corresponding bis(halo)tetraalkylbenzenes may be used. Preferred bis(hydroxymethyl)tetraalkylbenzenes that may be used in the process of the invention include those compounds having a benzene ring substituted with two hydroxymethyl radicals and the remaining ring carbon atoms substituted with four separate alkyl radicals which preferably contain no more than 10 carbon atoms. Particularly preferred is bis(hydroxymethyl)tetramethylbenzene.

The above-described bis(hydroxymethyl)tetraalkylbenzenes are preferably obtained by hydrolyzing the corresponding bis(halomethyl)tetraalkylbenzenes described above. Thus, 1,4-bis(hydroxymethyl)tetramethylbenzene is obtained by hydrolyzing 1,4-bis(chloromethyl)tetramethylbenzene.

The phenols to be used in the preparation of the stabilizers of the invention are phenols which have one or more ring carbon atoms attached to —OH groups, at least one ring carbon atom ortho- or para- thereto attached to hydrogen and the other ring carbon atoms attached to a member of the group consisting of hydrogen, halogen and hydrocarbon radicals. These phenols may be mono- or polynuclear. If polynuclear, they may have the rings fused or the rings may be joined by dispersing chains, which may be straight carbon chains or substituted chains as oxygen- or sulfur-containing chains. Examples of suitable phenols include, among others, phenol, tert-butylphenol, octylphenol, o-tert-butyl-p-cresol, p-tert-butyl-o-cresol, p-tert-octyl-m-cresol, p-chlorophenol, resorcinol, cathechol, 2,2-bis(4-hydroxyphenyl)propane, pyrocatechol, hydroquinone, pyrogallol, hydroxyhydroquinone, phloroglucinol, di(hydroxyphenyl)ether, di(hydroxyphenyl)sulfide, 2,2-bis(4-hydroxyphenyl)butane, 2,2-bis(4-hydroxyphenyl)pentane, 1,5-dihydroxynaphthalene, p-ethylphenol, p-butylresorcinol, p-ethylpyrogallol, 4-isobutyl-2,5-dimethylphenol, 4-butyl-2-ethylnaphthol, p-hexylphloroglucinol, 4-phenyl-3-chlorophenol, p-octylcatechol, 4-hexyl-1,5,6,7-naphthalenetetrol, p-pentyl-o-ethylresorcinol, p-heptylcatechol, 4-cyclohexyl-1,6-anthracenediol, and the like.

As indicated above, the reaction between the substituted benzenes and the phenols may be accomplished by heating the two components together. The reaction between the bis-hydroxymethyltetraalkylbenzenes and the phenols in some cases is quite slow and for more efficient results it is preferred to conduct the reaction in the presence of an acidic catalyst, such as p-toluenesulfonic acid, hydrogen chloride, sulfuric acid, aluminum chloride, and the like, in amounts preferably varying from about 0.1% to 3% by weight.

The quantities of the substituted benzene and the phenol to be used in the preparation will depend upon the functionality of the phenol, i.e., the number of ortho- or parapositions being substituted with hydrogen and upon the type of product desired. If the phenolic reactant has a functionality of one, such as, for example, 2,4-xylenol, the phenolic material and the substituted benzene are reacted in at least a chemical equivalent amount and preferably in approximately chemical equivalent amounts. The expression "chemical equivalent amount" as used herein to refer to the ratio of the reactants means the amount needed to furnish one functional group on the substituted benzene reactant for every hydrogen atom to be replaced on the phenol reactant. If the phenolic material has a functionality greater than 1, then more than a chemical equivalent amount of the phenolic material should be employed in order to prevent polymerization. In this case, the phenolic reactant and substituted benzene are preferably combined in chemical equivalent ratios varying from about 3:1 to 5:1.

The reaction may be accomplished in the presence or absence of solvents or diluents. If solvents or diluents are employed, they are preferably the polyhalogenated hydrocarbons, such as tetrachloroethane, hexachloropropane, dichloro- and trichlorobenzene and carbon tetrachloride. The phenols used in the reaction are generally good diluents and it is sometimes preferred to utilize the phenols in excess so that they may be used as reactant and diluent.

The temperature used to effect the reaction may also vary over a considerable range. In general, temperatures employed in the process will vary from about 50° C. to about 300° C. If one or more of the reactants are solid or semi-solid, the higher reaction temperature, such as 50° C. to 200° C., may be needed to effect the desired melting of the solids. Preferred temperatures generally range from about 100° C. to 250° C. Pressures employed may be atmospheric, subatmospheric or superatmospheric as desired or necessary.

The polynuclear polyhydric phenols produced by the above-described process may be recovered from the reaction mixture by any conventional method, such as filtration, centrifugation, solvent extraction and the like. The stabilizers of the present invention are semi-solids to solids which generally appear as white crystalline material. They are generally soluble in organic solvents, oils, fats and organic resins.

The amount of the stabilizer required for the present compositions will vary somewhat depending upon the molecular weight of the polymer, the choice of the polymer, the particular stabilizer selected, the ultimate utility of the finished product, and the like. Amounts ranging from about 0.01% to about 2%, by weight of the polymer, will cover all cases but usually the amount required will range only from about 0.1 to about 1.0% by weight. The stabilizers of this invention may be incorporated into the polymer by any conventional means. Milling or Banburying is particularly preferred because of its greater economy. If desired the stabilizers may be dissolved in a solvent and the thus prepared solution mixed with the polymer. The solvent may then be separated from the polymer by evaporation.

To illustrate the practice of the present invention Examples I–XII are devoted to methods of producing the stabilizers employed in the present compositions and Examples XIII to XVII are devoted to illustrating the stabilizing properties of compositions of this invention.

EXAMPLE I

This example illustrates the preparation of 1,4-bis[(2-hydroxy-3-tert-butyl-5-methylphenyl)methyl]tetramethylbenzene.

50 parts of o-tert-butyl-p-cresol, 23.1 parts of 1,4-bis(chloromethyl)tetramethylbenzene and 100 parts of tetrachloroethane were placed in a reaction flask attached to an air-cooled condenser and the mixture heated to boiling for about one hour. The reaction mixture was then poured into an open container and cooled. Crystals began to separate almost immediately. The precipitate was collected, dried and then recrystallized. The white crystalline product having a melting point of 295° C. to 300° C. was identified as 1,4-bis[(2-hydroxy-3-tert-butyl-5-methylphenyl)methyl]tetramethylbenzene. C, found 84%, calc. 84.1%; H, found 9.1%, calc. 9.4%; weak acidity, found .41 eq./100 g., calc. .412 eq./100 g.; mol wt., found 486, calc. 486.

EXAMPLE II

This example illustrates the preparation of 1,4-bis[(2-hydroxy-3,5-dimethylphenyl)methyl]tetramethylbenzene.

36.6 parts of 2,4-xylenol and 23.1 parts of 1,4-bis(chloromethyl)tetramethylbenzene were placed in a reaction flask equipped with an air-cooled condenser. The mixture was heated to melt the components. The temperature was then slowly raised to 200° C.–210° C. and held at that point for 30 minutes. The product was dissolved in 1:1 methyl ethyl ketone and toluene and the solution allowed to cool. The white crystals that collected (70% yield) had a melting point of 258° C. and were identified as 1,4-bis[(2-hydroxy-3,5-dimethylphenyl)methyl]tetramethylbenzene. C, found 83.5%, calc. 83.5%; H, found 8.5%, calc. 8.47%; weak acidity, found .50, calc. .498 eq./100 g.

EXAMPLE III

This example illustrates the preparation of 1,4-bis[(2-hydroxy-3-tert-butyl-5-ethylphenyl)methyl]tetramethylbenzene.

540 parts of 2-tert-butyl-4-ethylphenol, 230 parts of 1,4-bis(chloromethyl)tetramethylbenzene and 100 parts of tetrachloroethane are placed in a reaction flask attached to an air condenser and the mixture heated to boiling for about one hour. The reaction mixture is then poured into an open container and cooled. The white crystals that separate are dried and then recrystallized. The product is identified as 1,4-bis[(2-hydroxy-3-tert-butyl-5-ethylphenyl)methyl]tetramethylbenzene.

EXAMPLE IV 1,4-bis[(2-hydroxy-3-octyl-5-ethylphenyl)methyl]tetramethylbenzene is produced by the method shown in the preceding example wherein the 2-tert-butyl-4-ethylphenol is replaced by an equivalent amount of 2-octyl-4-ethylphenol. The resulting product is a white crystalline high-melting solid.

EXAMPLE V

This example illustrates the preparation of 1,3-bis[(2,4-dihydroxy-3-tert-butyl - 5 - methylphenyl)methyl]tetramethylbenzene.

50 parts of 1,3-dihydroxy-2-tert-butyl-4-methylbenzene and 23.1 parts of 1,3-bis(chloromethyl)isodurene are mixed and heated to about 55–60° C. and HCl evolved. The mixture is heated to 140° C. and kept there one hour. The mixture is then poured into a beaker where white crystals separate. The product is recrystallized and dried. Analysis indicates that the product is the above-noted 1,3-bis[(2,4 - dihydroxy-3-tert-butyl-5-methylphenyl)methyl]tetramethylbenzene.

Polynuclear polyphenols having related structures are obtained by replacing the 1,3-dihydroxy-2-tert-butyl-4-methylbenzene in the above-described process with equivalent amounts of each of the following phenols: o-tert-octylcresol, 2-tert-hexyl-5-butylphenol and 2,5-di-tert-butylphenol.

EXAMPLE VI

This example illustrates the preparation of 1,4-bis[(4-hydroxyphenyl)methyl]tetramethylbenzene.

4.62 parts of 1,4-bis(chloromethyl)tetramethylbenzene were mixed with 20 parts of phenol. The mixture was heated and there was a rapid evolution of hydrogen chloride. The mixture was heated at 150° C. to 170° C. for 30 minutes while nitrogen was bubbled through the reaction mixture. The mixture was then poured into a solution of 100 parts of water and 100 parts of methanol. The resulting combination was heated to boiling. When most of the solvent was removed, water was added and the boiling continued. This was repeated until substantially all of the excess phenol had co-distilled with the water. The residue was then crystallized from toluene-petroleum ether. The white crystalline product had a melting point of 270–271° C. and was identified as 1,4-bis[(4 - hydroxyphenol)methyl]tetramethylbenzene. C, found 82.2%; calc. 83.5%; H, found 7.8%, calc. 7.6%; OH, eq./100 g., found 0.56, calc. 0.578.

EXAMPLE VII

This example illustrates the preparation of 1,4-bis[(2-hydroxy-5-chlorophenyl)methyl]tetramethylbenzene.

79.2 parts of p-chlorophenol and 23.1 parts of 1,4-bischloromethyl)tetramethylbenzene were placed in a reaction flask equipped with an air-cooled condenser and thermometer. The mixture was heated and hydrogen chloride evolved immediately. 50 parts of trichlorobenzene were added and the mixture refluxed until the evolution of hydrogen chloride had essentially stopped. The reaction mixture was poured into a beaker. Toluene was added and the solution boiled. The solution was then filtered hot and cooled. The white crystals that separated were collected, dried and then recrystallized. The white solid product had a melting point of 297–398° C. and was identified as 1,4-bis[(2-hydroxy-5-chlorophenyl)methyl]tetramethylbenzene. C, found 69.5%, calc. 69.3%; H, found 5.9%, calc. 5.79%; chlorine, found 16.2%, calc. 17.1%; weak acidity, found 0.48 eq./100 g., calc. 0.482 eq./100 g.

EXAMPLE VIII

This example illustrates the preparation of 1,4-bis[(2-hydroxy-5-octylphenyl)methyl]tetrabutylbenzene.

600 parts of p-octylphenol, 272 parts of 1,4-bis(chloromethyl)tetrabutylbenzene and 200 parts of tetrachloroethane are placed in a reaction flask attached to an air condenser and the mixture heated to boiling for several hours. The reaction mixture is then poured into an open container and cooled. The crystals that separate are dried and then recrystallized. The white crystalline high-melting solid is identified as 1,4-bis[(2-hydroxy-5-octylphenyl) methyl]tetrabutylbenzene.

Polynuclear polyhydric phenols having related structures are obtained by replacing the bis(chloromethyl) tetrabutyl benzene in the above-described process with equivalent amounts of each of the following: bis-(chloromethyl)tetraisopropylbenzene and bis(chloromethyl)trimethyloctylbenzene.

EXAMPLE IX

This example illustrates the preparation of 1,2-bis[(2,3-dihydroxyphenyl)methyl]tetramethylbenzene.

About 350 parts of pyrocatechol and 230 parts of 1,2-bis(chloromethyl)tetramethylbenzene and 100 parts of tetrachloroethane are placed in the above-described reaction flask and the mixture heated to boiling for one hour. The reaction mixture is then poured into an open container and cooled. The white crystals that separate are collected, dried and recrystallized. The resulting white crystalline high-melting product is identified as 1,2-bis [(2,3-dihydroxyphenyl)methyl]tetramethylbenzene.

Polynuclear polyhydric phenols having related structures are obtained by replacing the pyrocatechol in the above preparation process with equivalent amounts of each of the following: resorcinol, hydroquinone, 2,4-dihydroxy-5-tert-butylbenzene and phloroglucinol.

EXAMPLE X

This example illustrates a method for preparing the polynuclear polyphenol of Example II by reacting 2,4-xylenol with 1,4-bis(acetoxymethyl)tetramethylbenzene.

10.8 parts of 2,4-xylenol, 10.6 parts of 1,4-bis(acetoxymethyl)tetramethylbenzene and 25 parts of tetrachloroethane were placed in a reaction flask and the mixture heated to boiling. Distillation of the formed acetic acid began at a kettle temperature of 156° C. The distillation was interrupted when the kettle temperature reached 200° C. The contents of the kettle were dissolved in boiling toluene and allowed to crystallize. The first crop of crystals melted at about 255° C. Recrystallization gave a product having substantially the same melting point as the product in Example II. Yield of product was 83.7%.

The compound of Example III is prepared by the same method by reacting 2-tert-butyl-5-ethylphenol with 1,4-bis-acetoxymethyl)tetramethylbenzene, and a compound of Example VI is prepared by the same method by reacting phenol with 1,4-bis(acetoxymethyl)tetramethylbenzene.

EXAMPLE XI

This example illustrates a method for preparing the polynuclear polyphenol of Example II by reacting a 2,4-xylenol with 1,4-bis(hydroxymethyl)tetramethylbenzene.

17 parts of 1,4-bis(hydroxymethyl)tetramethylbenzene, 25 parts of 2,4-xylenol and 0.3 part of para-toluensulfonic acid and 25 parts of 1,1,2,2-tetrachloroethane were placed in a reaction flask and the mixture heated to boiling. The water formed in the reaction was allowed to escape. During the course of the reaction 25 more parts of tetrachloroethane was added and the heating continued. After a heating period of about ½ hour, the flask was cooled and the contents dissolved by boiling in toluene. The mixture was allowed to cool and the crystals filtered off. The crystals had a melting point of 258° C. to 260° C. Yield was 85%.

The compound of Example IV is prepared by the same method by reacting 2-octyl-5-ethylphenol with 1,4-bis(hydroxymethyl)tetramethylbenzene; the compound of Example I is prepared by this method by reacting o-tert-butyl-p-cresol with bis(hydroxymethyl)durene and the compound of Example V is prepared by reacting o-tert-butylcresol with bis(hydroxymethyl)durene.

EXAMPLE XII

This example illustrates the preparation of the compound of Example VI, i.e., 1,4-bis[(4-hydroxyphenyl) methyl]tetramethylbenzene, in higher yield by using lower reaction temperatures.

250 parts of phenol were added to a reaction flask equipped with stirrer, thermometer, gas inlet tube, condenser and funnel. With rapid stirring and a very rapid stream of nitrogen bubbling through the phenol, the reaction flask was heated to about 50° C. 75 parts of 1,4-bis (chloromethyl)tetramethylbenzene were slowly added over 30 minutes while the flask was kept at 52° C.–55° C. The mixture was maintained at 55° C. to 66° C. for about 45 minutes more and then the mixture was transferred to a distillation flask and the excess phenol removed. The material in the kettle solidified and this product was washed in boiling toluene. The white crystalline material, which was obtained, was filtered off. The product had a melting point of about 266–269° C. and on recrystallization a melting point of about 270° C. Yield of product was 76.5%.

From the foregoing it will be seen that the stabilizers utilized in the present invention may be greatly varied by merely changing the nature of the starting materials, i.e., the tetraalkyl benzenes and/or the phenolic compounds. However, it is noteworthy that, as the number of constituents increases either in regard to the number of carbon atoms per substituent and/or in regard to the total number of substituents on the phenolic ring, stronger reaction conditions are usually required in order to produce more suitable yields and rates of reaction. Such stronger conditions of reaction may comprise the use of the higher temperatures indicated, the use of elevated pressures and larger amounts of catalyst, but from the foregoing examples it will be seen that reactions, in essence, are quite simple in order to produce the stabilizers.

For Examples XIII to XVII several of the stabilizers prepared by the methods indicated in the prior examples are mixed with polypropylene and sheets thereof are formed. The results are tabulated in Table I. In all cases the unstabilized polypropylene had an initial intrinsic viscosity of 6.4 dl./g., a titanium content of 170 p.p.m. aluminum content of 69 p.p.m., total ash of 0.06% by weight, and a crystalline content of 92.4%. The titanium and aluminum are residues of the catalyst employed for the preparation of the polypropylene, namely the reaction product of titanium trichloride and aluminum triethyl in the mole ratio of 3:1. In Table I the natural weathering test indicates the number of days for complete embrittlement to take place with a sample exposure to outdoor weathering. The "133° C. oven" test involves placing a sample of polypropylene film in an air-circulating oven maintained at 133° C. and determining the number of hours before complete embrittlement takes place.

From the natural weathering conditions of the exposed polypropylene films, it will be observed that they exhibit very high stability against ultraviolet light degradation and degradation due to atmospheric oxygen. From the 133° C. oven test it will be seen that the films have high stability to degradation caused by heat. In addition to the above, the compositions will be found to have improved stability to molecular weight degradation during processing as is shown from a typical example wherein a sample of the polypropylene powder (I.V. 6.4) was heated for 15 minutes at 290° C. When the powder was not protected the I.V., measured in decalin at 150° C., after heating was 0.40 dl./gram whereas when 0.5% of the stabilizer of Example XIV was added to the powder, prior to heating, the I.V. after heating for the same period was 2.05 dl./gram.

TABLE I

| Ex. | Stabilizer | Concentration, parts by weight | Natural Weatherings, days | 133° C. Oven, hours |
|---|---|---|---|---|
|  | None | | <10 | 6 |
| XIII | 1,4-bis(2-hydroxy-3-tert-butyl-5-methyl-phenyl)tetramethylbenzene. | 0.5 | 39 | 298 |
| XIV | 1,4-bis[(4-hydroxy-3,5-di-ter-tbutylphenyl)methyl]tetramethylbenzene. | 0.25 | 23 | 45 |
|  |  | 0.50 | 65 | 257 |
|  |  | 0.75 | 58 | 342 |
|  |  | 1.0 | 58 | 417 |
| XV | 1,4-bis[(2-hydroxy-3-tert-butyl-5-ethyl-phenyl)methyl]tetramethylbenzene. | 0.5 | 37 | 250 |
|  |  | 0.75 | 37 | 297 |
|  |  | 1.0 | 37 | 400–435 |
| XVI | 1,4-bis[(2-hydroxy-3-tert-butyl-5-methyl-phenyl)methyl]tetramethyl-benzene. | 0.5 | | 142 |
| XVII | 1,3-bis[(2,4-dihydroxy-3,6-di-tert-butyl-5-methylphenyl)methyl]tetramethyl-benzene. | 1.0 | 48 | 381 |

In a similar manner the corresponding isodurene, prehnitene, tetraethylbenzene, tetrapropylbenzene derivitives, and those of higher analogs will exhibit similar ability to impart improved stability to polymers of alpha-olefins including polymers of polyethylene. The unstabilized polyethylene, which inherently contains the residues of low-pressure catalyst, inherently has greater stability against the various forms of oxidation than polypropylene so that the stabilized polyethylene will require longer exposure to conditions of oxidation before embrittlement sets in. Because of this inherent difference between the two polymers, the amount of stabilizer used to stabilize polyethylene may usually be lower. Conversely, when the monomeric unit has more than three carbon atoms the amount of stabilizer is generally higher. This is the case, with, for example, the polymeric films prepared from the previously described branched olefins having up to a total of about 10 carbon atoms.

The reasons why the present stabilizers function against ultraviolet degradation, oxidation degradation, thermal degradation, and reduction of I.V. during high-temperature processing are not understood. Some stabilizing influences of alkylated phenols are known but this would not account for the ability of the present invention to stabilize against all forms of embrittlement and also against the high temperature. Most likely the presence of the tetraalkylbenzene nucleus exerts a profound influence in this regard but it is not understood how it functions. Nevertheless, this invention is not limited by theoretical considerations and the numerous modifications suggested above may be considered and adopted without departing from the spirit of the invention.

I claim as my invention:

1. A composition comprising normally solid polypropylene stabilized against embrittlement by incorporation of from about 0.01 to about 2% by weight of bis(2-hydroxy-3-tert-butyl-5-methylphenyl)durene.

2. A composition comprising normally solid polypropylene stabilized against embrittlement by incorporation of from about 0.01 to about 2% by weight of bis[(4-hydroxy-3,5-di-tert-butylphenyl)methyl]durene.

References Cited

UNITED STATES PATENTS

| 2,985,617 | 5/1961 | Salyer et al. | 260—45.95 |
| 3,062,895 | 11/1962 | Martin et al. | 260—45.95 |
| 2,957,849 | 9/1960 | Kennedy | 260—45.95 |

FOREIGN PATENTS

| 1,020,875 | 2/1953 | France. |
| 806,014 | 11/1958 | Great Britain. |
| 1,171,286 | 9/1958 | France. |
| 205,495 | 9/1959 | Austria. |
| 758,973 | 10/1956 | Great Britain. |

DONALD E. CZAJA, *Primary Examiner.*

L. J. BERCOVITZ, M. STERMAN, J. R. LIBERMAN, A. M. BOETTCHER, *Examiners.*

H. E. TAYLOR, S. H. BLECH, *Assistant Examiners.*